United States Patent
Ollivier et al.

(10) Patent No.: US 6,290,750 B1
(45) Date of Patent: Sep. 18, 2001

(54) PRODUCTION PLANT AND PROCESS COMPRISING SEVERAL TREATMENT STEPS

(75) Inventors: Patrice Ollivier, Ymeray; Christophe Charrier, Asnieres sur Seine; Dominique Jouvaud, Paris, all of (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/427,278

(22) Filed: Oct. 26, 1999

(30) Foreign Application Priority Data

Oct. 26, 1998 (FR) .................................................. 98 13366

(51) Int. Cl.$^7$ .......................... B01D 53/04; B01D 53/22
(52) U.S. Cl. ...................... 95/19; 95/22; 95/47; 95/130; 96/4; 96/114; 96/421
(58) Field of Search ................................. 95/19, 22, 47, 95/138, 45, 130; 96/4, 113, 114, 421

(56) References Cited

U.S. PATENT DOCUMENTS

| | | | |
|---|---|---|---|
| 4,857,082 | * 8/1989 | DiMartino, Sr. et al. | ............... 95/19 |
| 5,077,029 | 12/1991 | Schaub | ................................. 423/351 |
| 5,258,056 | 11/1993 | Shirley et al. | ............................ 95/22 |
| 5,440,891 | 8/1995 | Hindmon, Jr. et al. | ................ 62/117 |
| 5,496,388 | 3/1996 | Tellier | ................................... 55/210 |
| 5,588,984 | * 12/1996 | Verini | .................................. 95/19 X |
| 5,688,306 | * 11/1997 | Verini | .................................. 95/19 X |
| 5,840,098 | * 11/1998 | Barbe et al. | ............................ 95/18 |
| 5,851,293 | * 12/1998 | Lane et al. | ........................... 95/22 X |

FOREIGN PATENT DOCUMENTS 0 512 780    11/1992   (EP) .

* cited by examiner

Primary Examiner—Robert H. Spitzer
(74) Attorney, Agent, or Firm—Young & Thompson

(57) ABSTRACT

The plant for producing a product stream includes, mounted in series, several modules adapted to perform successive and distinct elementary treatments. At least two elementary treatment modules each include at least two treatment apparatuses mounted in parallel. The plant furthermore includes a device for controlling the various treatment apparatuses as a function of the product stream desired at the outlet of the plant. The control device includes sensors for measuring at least two variables representative of the product stream, and a fuzzy logic regulator adapted for controlling, in at least two distinct treatment modules, at least two treatment apparatuses of the same module, on the basis of the same measured representative variable.

9 Claims, 1 Drawing Sheet

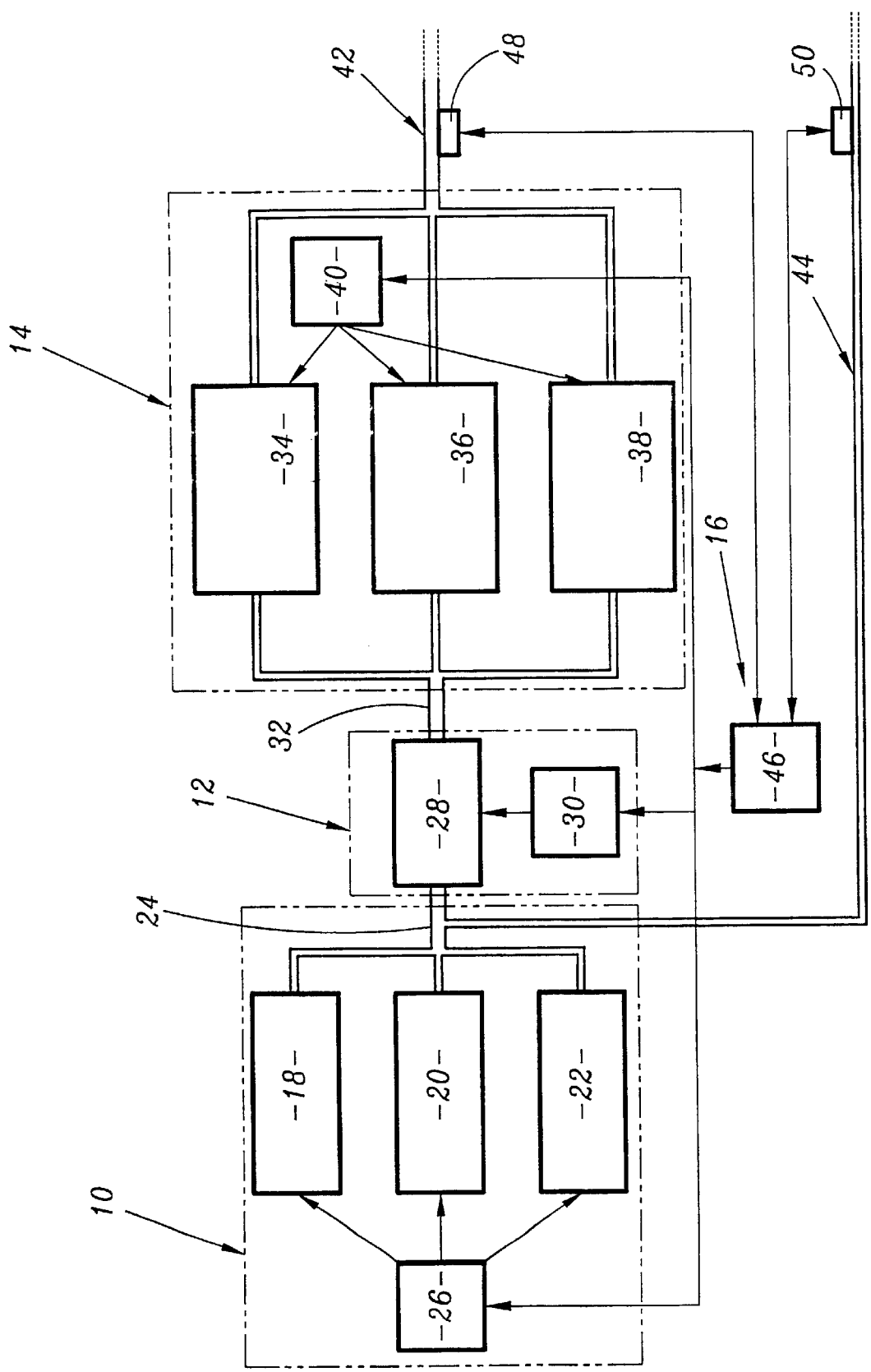

PRODUCTION PLANT AND PROCESS COMPRISING SEVERAL TREATMENT STEPS

FIELD OF THE INVENTION

The present invention relates to a plant for producing at least one product stream intended to feed at least one consumer device, of the type comprising, mounted in series, several modules adapted to perform successive and distinct elementary treatments for the production of the product stream, at least two elementary treatment modules each comprising at least two treatment apparatuses mounted in parallel, and each module being adapted so as to carry out the same elementary treatment, the plant furthermore comprising means for controlling the various treatment apparatuses a function of the product stream desired at the outlet of the plant,

BACKGROUND OF THE INVENTION

Such plants intended in particular for the production of gaseous nitrogen from atmospheric air are known.

The plant generally comprises, in series, three modules adapted for implementing distinct elementary treatments for the production of gaseous nitrogen. In particular, the nitrogen production plant comprises in succession a compression module, downstream of which is disposed a drying and filtering module, which feeds a nitrogen separation module.

The treatment modules frequently comprise at least two treatment apparatuses mounted in parallel. This structure allows continuous production, especially during periods of maintenance of one of the apparatuses, or in the event of a failure of one of them.

In order to provide for the coordinated start-up of the treatment apparatuses of the same module, as well as control of their operating parameters each treatment module comprises control means providing for the control of just the treatment apparatuses of the relevant module as a function of predefined set values.

To ensure compliance with the set values, the control means of each module are connected to sensors disposed immediately at the outlet of the relevant treatment module.

Thus, in a production plant comprising several treatment modules each enclosing at least two treatment apparatuses mounted in parallel, the control means, specific to each treatment module, increase the complexity of the plant. In practice, these control means, which have access only to the readings taken at the outlet of the treatment module associated with them, can only drive the various treatment apparatuses in accordance with simple algorithms, thus limiting the overall performance of the plant.

SUMMARY OF THE INVENTION

The aim of the invention is to provide a production plant which has access to high-performance control means but the implementation of which is simple, For this purpose, the subject of the invention is a plant of the aforesaid type, characterized in that the control means comprise sensors for measuring at least two variables representative of the product stream, and a fuzzy logic regulator adapted for controlling, in at least two distinct treatment modules, at least two treatment apparatuses of the same module, on the basis of the same measured representative variables.

According to particular embodiments, the plant comprises one or more of the following characteristics;

the control means comprise, for each treatment module, a control unit able to control just the treatment apparatuses of the relevant module, and a central drive unit connected to the control units and to the measurement sensors for the control of the treatment apparatuses from their associated control unit, on the basis of drive commands formulated by the central drive unit as a function of the measured representative variables, by applying fuzzy logic;

the treatment modules are each adapted to the treatment of gases, in particular compressed air and nitrogen, and are disposed in succession on a pipe for transporting the gas to be treated;

the sensors are disposed at the outlets of the plant; and it comprises at least two outlets for producing distinct product streams, of which at least two of the outlets are equipped with sensors for measuring at least two variables representative of the associated product stream, and in that the fuzzy logic regulator is adapted for controlling the treatment apparatuses, on the basis of the representative variables measured on each outlet.

The subject of the invention is furthermore a process for producing a product stream intended to feed a consumer device implementing, mounted in series, several modules adapted for performing successive and distinct elementary treatments for the production of the product stream, at least two elementary treatment modules comprising at least two treatment apparatuses mounted in parallel, and each apparatus being adapted so as to carry out the same elementary treatment, in which the various treatment apparatuses are controlled as a function of the desired product stream, characterized in that, for the control of the treatment apparatuses, it comprises the following steps:

measuring at least two variables representative of the product stream, and implementing a fuzzy logic regulator which controls, in at least two distinct treatment modules, at least two treatment apparatuses of the same module, on the basis of the same measured representative variables.

BRIEF DESCRIPTION OF THE DRAWING

The invention will be better understood on reading the description which follows, given merely by way of example and with reference to the single Figure which is a schematic view of a plant according to the invention.

DETAILED DESCRIPTION OF PREFERRED EMBODIMENT

Represented schematically in this Figure is a plant for producing gaseous nitrogen from atmospheric air. This plant comprises, mounted in series, an atmospheric air compression module 10, a drying and filtering module 12, and finally a nitrogen separation module 14.

The plant furthermore comprises control means 16 intended for the control of the Various modules so as to obtain, at the outlet, a nitrogen stream corresponding to a predetermined setting.

The compression module 10 comprises three compressors 18, 20, 22 whose outlets are connected in parallel so as to culminate in a common collector 24. The latter is connected to the inlet of the drying and filtering module 12.

The three compressors 18, 20, 22 are adapted for tapping off air directly from the atmosphere.

A control unit 26 specific to the three compressors 18, 20, 22 is furthermore provided in the compression module 10.

This control unit 26 is for example formed by a programmable controller of any suitable type.

The drying and filtering module 12 comprises a single drying and filtering unit 28 controlled by a control unit 30, formed for example by a suitable programmable controller.

The outlet of the drying and filtering module 12 is connected to the inlet of the separation module 14 by a linking pipe 32.

The separation module comprises, connected in parallel, two zeolite-filled adsorption columns 34, 36 and a membrane-type separator 38.

The two adsorption columns 34, 36 and the membrane-type separator 38 are connected to a control unit 40 specific to the separation module 14. This control unit is formed for example by a programmable controller.

The outlets of the two adsorption columns 34, 36 and of the membrane-type separator 38 are connected so as to constitute a single nitrogen production outlet 42.

Moreover, a tap is provided on the collector 24 so as to supply a compressed air distribution outlet 44.

The control means 16 of the plant additionally comprises control units 26, 30 and 40 and a central drive unit 46 connected by information transmission means, such as a data bus, to the control units 26, 30 and 40 specific to each of the treatment modules 10, 12 and 14. The central drive unit 46 is constituted for example by a microcomputer.

The central drive unit 46 is connected to pressure sensors 48, 50 which are provided on the outlets 42 and 44 respectively.

The central drive unit 46 is adapted to determine, on the basis of the information read off by the sensors 48, 50, the changes in the pressure P and in the derivative $\Delta P/\Delta t$ of the pressure with respect to time for the two outlets 42 and 44.

Furthermore, the central drive unit 46 comprises a fuzzy logic regulator adapted for controlling, by implementing a fuzzy logic decisional scheme, each of the treatment units of the various modules 10, 12, 14.

For this purpose, control commands are formulated by the central drive unit 46 by applying fuzzy logic on the basis of the same measured representative variables P and $\Delta P/\Delta t$. The pairs of variables used are measured at the two outlets of the plant, and the fuzzy logic therefore takes four variables into account.

The control commands are thereafter addressed to the control units 26, 30, 10 specific to each module. These units then control the treatment apparatuses of the relevant module as a function of the control commands received.

Recourse to fuzzy logic makes it possible to reduce the number of variables measured since only variables measured at the outlet are used to control all the apparatuses, regardless of their position in the plant. This reduction in the number of variables allows a simplification of the control and regulating means.

Additionally, all the apparatuses of the plant are controlled from the same central drive unit 46, ever if they are of different kinds and carry out distinct treatments. Thus, it is possible to optimize the manner of operation of the plant by taking account of the interactions between the apparatuses of the various modules, and to do so on the basis of the values of just the variables measured at the outlet.

What is claimed is:

1. Process for producing at least one product stream intended to feed a consumer device implementing, mounted in series, several modules adapted for performing successive and distinct elementary treatments for the production of the product stream, at least two elementary treatment modules comprising at least two treatment apparatuses mounted in parallel, and each apparatus being adapted so as to carry out the same elementary treatment, in which the various treatment apparatuses are controlled as a function of the desired product stream, wherein for the control of the treatment apparatuses, the process comprises the following steps:

measuring at least two variables representative of the product stream, and implementing a fuzzy logic regulator which controls, in at least two distinct treatment modules, at least two treatment apparatuses of the same module, on the basis of the same measured representative variables.

2. Process according to claim 1, for the production of at least one gas, wherein the variables are a pressure and a time derivative of this pressure.

3. Process according to claim 2, for the production of at least one gas of air from atmospheric air wherein the successive and distinct elementary treatments comprise compressing atmospheric air, drying and filtering and separating the gas.

4. Plant for producing at least one product stream intended to feed at least one consumer device, comprising, mounted in series, several modules adapted to perform successive and distinct elementary treatments for the production of the product stream, at least two elementary treatment modules each comprising at least two treatment apparatuses mounted in parallel, and each module being adapted so as to carry out the same elementary treatment, the plant furthermore comprising means for controlling the various treatment apparatuses as a function of the product stream desired at the outlet of the plant, wherein the control means comprise sensors for measuring at least two variables representative of the product stream, and a fuzzy logic regulator adapted for controlling, in at least two distinct treatment modules, at least two treatment apparatuses of the same module, on the basis of the same measured representative variables.

5. Plant according to claim 4, wherein the control means comprise, for each treatment module, a control unit able to control just the treatment apparatuses of the same module, and the fuzzy logic regulator connected to the control units and to the measurement sensors for the control of the treatment apparatuses from their associated control unit, on the basis of drive commands formulated by the fuzzy logic regulator as a function of the measured representative variables, by applying fuzzy logic.

6. Plant according to claim 4, wherein the sensors are disposed at outlets of the plant.

7. Plant according to claim 6, wherein the outlets comprise at least two outlets for producing distinct product streams, of which at least two of the outlets are equipped with the sensors for measuring at least two variables representative of the associated product stream, and the fuzzy logic regulator is adapted for controlling the treatment apparatuses, on the basis of the representative variables measured on each outlet.

8. Plant according to claim 4, wherein the treatment modules comprise, in succession, an atmospheric air compression module, a drying and filtering module and a nitrogen separation module and are disposed on a pipe.

9. Plant according to claim 4, wherein the sensors are pressure sensors.

\* \* \* \* \*